United States Patent [19]

Pedain et al.

[11] Patent Number: 5,629,402
[45] Date of Patent: May 13, 1997

[54] COATING COMPOSITIONS AND THEIR USE FOR THE PREPARATION OF COATINGS PERMEABLE TO WATER VAPOR

[75] Inventors: Josef Pedain; Detlef-Ingo Schütze, both of Cologne; Wilhelm Thoma, Leverkusen; Klaus Nachtkamp, Duesseldorf, all of Germany

[73] Assignee: Bayer Aktiengesellschaft, Leverkusen, Germany

[21] Appl. No.: 221,214

[22] Filed: Mar. 31, 1994

Related U.S. Application Data

[63] Continuation of Ser. No. 914,716, Jul. 16, 1992, abandoned.

[30] Foreign Application Priority Data

Aug. 1, 1991 [DE] Germany ............... 41 25 454.6

[51] Int. Cl.⁶ .................. C08G 18/48; C08G 18/80; C08G 18/38
[52] U.S. Cl. .................. 528/45; 524/590; 524/840; 524/871; 524/874; 524/875; 528/49; 528/52; 528/57; 528/60; 528/61; 528/64; 528/65; 528/71; 528/76; 528/80; 528/85; 427/389; 427/389.9; 427/393.4
[58] Field of Search ................... 528/45, 49, 52, 528/57, 71, 76, 80, 85, 60, 61, 65, 64; 524/590, 840, 871, 874, 875; 427/389, 389.9, 393.4

[56] References Cited

U.S. PATENT DOCUMENTS

| | | | |
|---|---|---|---|
| 3,687,715 | 8/1972 | Kigane et al. | 428/215 |
| 4,201,824 | 5/1980 | Violland et al. | 428/262 |
| 4,237,264 | 12/1980 | Noll et al. | 528/67 |
| 4,303,774 | 12/1981 | Nachtkamp et al. | 528/71 |
| 4,367,327 | 1/1983 | Holker et al. | 528/61 |
| 4,501,852 | 2/1985 | Markusch et al. | 524/840 |
| 4,594,385 | 6/1986 | Thoma et al. | 524/839 |
| 4,605,571 | 8/1986 | Watanabe et al. | 427/387 |
| 4,623,416 | 11/1986 | Henning et al. | 524/840 |
| 4,652,466 | 3/1987 | Thoma et al. | 427/244 |
| 4,764,553 | 8/1988 | Mosbach et al. | 524/840 |
| 4,871,798 | 10/1989 | Dormish et al. | 524/840 |
| 4,895,894 | 1/1990 | Ruetman et al. | 524/840 |
| 4,942,214 | 7/1990 | Sakhpara | 528/59 |
| 5,039,733 | 8/1991 | Dormish et al. | 524/840 |
| 5,204,403 | 4/1993 | Furuta et al. | 524/493 |
| 5,238,732 | 8/1993 | Krishnan | 428/267 |
| 5,239,036 | 8/1993 | Krishnan | 528/28 |
| 5,239,037 | 8/1993 | Krishnan | 528/28 |
| 5,276,125 | 1/1994 | Pedain et al. | 528/45 |
| 5,508,370 | 4/1996 | Reiff et al. | 528/45 |

FOREIGN PATENT DOCUMENTS

| | | |
|---|---|---|
| 0304718 | 3/1989 | European Pat. Off. . |
| 313951 | 5/1989 | European Pat. Off. . |
| 1220384 | 7/1966 | Germany . |
| 1226071 | 10/1966 | Germany . |
| 1922329 | 11/1969 | Germany . |
| 3315596 | 10/1984 | Germany . |
| 3736652 | 5/1989 | Germany . |
| 58-57420 | 4/1983 | Japan . |
| 59-36781 | 2/1984 | Japan . |
| 61-9423 | 1/1986 | Japan . |
| 1288401 | 9/1972 | United Kingdom . |

*Primary Examiner*—James J. Seidleck
*Assistant Examiner*—Rabon Sergent
*Attorney, Agent, or Firm*—Joseph C. Gil; Richard E. L. Henderson

[57] ABSTRACT

This invention relates to coating compositions containing (A) a polyurethane system containing either a polyurethane containing ionic groups and polyethylene oxide units or a precursor thereof prepared from a blocked isocyanate prepolymer and a cross-linking agent and, optionally, (B) organic solvents. This invention further relates to the use of such coating compositions to prepare coatings that are permeable to water vapor.

21 Claims, No Drawings

COATING COMPOSITIONS AND THEIR USE FOR THE PREPARATION OF COATINGS PERMEABLE TO WATER VAPOR

This application is a continuation of application Ser. No. 07/914,716 filed Jul. 16, 1992 abandoned.

BACKGROUND OF THE INVENTION

This invention relates to substances suitable for coating substrates, particularly flexible substrates such as textile sheet products, composed of (A)(a) a polyurethane containing hydrophilic groups or (A)(b) a precursor capable of forming a polyurethane (A)(a) at an elevated temperature and containing (i) blocked isocyanate prepolymer and (ii) cross-linking agents, and optionally (B)organic solvents. The invention further relates to the use of these substances for the preparation of coatings that are permeable to water vapor.

The term "polyurethanes" for the purpose of this invention also includes polyurethane ureas.

Coatings having a high permeability to water vapor have in the past repeatedly been the object of investigations and developments as they alone are suitable, for example, for the production of high quality leather substitutes or for articles of clothing with high wearing comfort.

Coatings of this kind may be produced by various methods, the most important of which will briefly be outlined here. A process which enables micropores to be produced in a coating by physical means has been known for a considerable time. In this process, a polymer (by which is meant, here and in the following, mainly a polyurethane polymer) dissolved in a solvent is applied in layers to a substrate or a separating support and transferred while still wet into a bath which contains a liquid that is a non-solvent for the polymer but is miscible with the solvent. The non-solvent therefore penetrates the layer of solution and gradually precipitates the polymer therein. When the resulting solidified film is dried, the solvent which escapes as well as the non-solvent leave microchannels behind which are available for the transport of water vapor in the coating.

It is similarly possible by the addition of powders of water-soluble salts to polymer solutions to produce coatings from which the salt can be washed out with water, leaving behind microcavities.

The perforation of compact polymer films by means of high energy electron radiation also gives rise to films that have high permeability to water vapor and can be laminated. This method, however, requires very expensive apparatus.

a variation of the microporous coating technique that dispenses with the complicated immersion bath technology but produces substantially the same results has recently been carried out. In this process—also known as "evaporation coagulation"—sufficient water is added to the solution of the polymer in a low boiling organic solvent so that the resultant spreadable paste still has just sufficient stability and can be applied. The organic solvent is the first component to be evaporated off. The water (which therefore continuously increases in proportion) precipitates the polymer as in the immersion process and finally escapes during drying., leaving a microporous structure in the film.

The immersion bath processes have the same major disadvantage as evaporation coagulation in that microchannels or microcavities weaken the permeable coatings. Consequently, the mechanical tensile strength and abrasion resistance are considerably inferior to those of a solid film.

Moreover, the imperviousness to water is not always sufficiently high for some purposes, for example, rainwear.

No shortage of attempts have, therefore, been made to produce permeability to water vapor in a coating not only by use of physical methods but also by chemical means. Thus, for example, it has been proposed to produce such coatings with polyurethanes consisting partly of water-soluble or hydrophilic starting components.

Thus, German Offenlegungsschriften 1,220,384 and 1,226,071 describe polyurethane coating compositions in which polyurethanes have been prepared from glycols, diisocyantes, and polyethylene glycols having molecular weights of 1000.

Polyethlene glycols may also be used as diol components in polyester polyols for polyurethane elastomers for the purpose, as disclosed in Japanese Patent Application 61/009, 423, of producing coatings which are permeable to water vapor and have little tendency to sell in water.

Solid top coats on composite materials of textile substrates and microporous coatings such as described in German Offenlegungsschrift 2,020,153 are also permeable to water vapor.

Segmented polyurethane elastomers of polyethylene glycols have also been disclosed in European Paten Application 52,915.

Other organic hydrophilic components have also been added to polyurethanes to produce water vapor-permeable composite materials and coatings. In particular, poly-γ-methylglutamate may be added to polyurethanes, used either as starting components or grafted to the polyurethanes. The numerous literature references describing this use include German Offenlegungsschriften 1,022,329 and 1,949,060 and Japanese Patent Applications 58/057,420 and 59/036,781 are among the many literature references describing this use.

Polyurethanes containing the above-mentioned polyethylene glycols as starting components have very recently been the main object of technical interest in the field of solid coatings that are permeable to water vapor. These raw materials are inexpensive, widely available, and technically easily obtainable. The polyurethanes and polyurethane ureas obtainable from them are in principle well known. In contrast to the widely used polyurethanes and polyurethane ureas that contain polyester diols, polycarbonate diols, or polyether diols as relatively high molecular weight diols, the above-mentioned polyurethanes are water absorbent and permeable to water vapor and in some cases can even swell strongly or dissolve in water. Hydrophobic polyols are therefore added to the polyethylene glycols which cause the hydrophilic character. The resultant mixtures may be used to produce polyurethanes or polyurethane ureas that combine good permeability to water vapor with high resistance to the influences of liquid water.

Because sheet products produced from such polyurethanes are invariably exposed to a considerable amount of atmospheric moisture in natural surrounds and by their nature also store more water than conventional polymer films that are impervious to water vapor, the starting materials mentioned above must be exceptionally resistant to hydrolysis.

Hydrophilic units of relatively high molecular weight polyethylene glycols within the polyurethane chain improve the permeability of the coatings to water vapor. The capacity of these layers to swell in water, however, causes pustular swellings to appear on the coatings when discrete water droplets are placed on them. These pustules are not only aesthetically a disadvantage in a textile or leather article of use but also constitute a serious technical defect. The tendency of the coatings to swell also leads, for example, to insufficient wet fastness, insufficient resistance to abrasion in the wet state, and insufficient resistance to washing.

In practice, the proportion of polyethylene glycol having a molecular weight of 1000 or more must be sufficiently low to avoid the above-mentioned disadvantages, but it is then impossible to obtain a very high permeability to water vapor. The use of polyethylene glycols having a molecular weight less than about 1000 would be preferable for obtaining desirable properties but in the products known in the present state of the art this would dramatically reduce the permeability of the coating to water vapor.

It was now surprisingly found that coatings which are extremely permeable to water vapor and at the same time have a very low tendency to sell in water can be produced by using coating compositions consisting of systems which contain (A) a polyurethane having ionic groups and polyethylene oxide units that are defined according to quantity and the length of sequence or corresponding precursor containing blocked isocyanate prepolymers and a cross-linking agent and, optionally, (B) organic solvents for component (A).

SUMMARY OF THE INVENTION

The present invention thus relates to coating compositions comprising
(A) a polyurethane system containing either
  (a) a polyurethane having an elongation at break (according to DIN 53,504) of from about 200 to about 1000% (preferably from 400 to 700%) prepared from one or more polyisocyantes, one or more diols having average molecular weights of from 350 to about 5000 (preferably from 800 to 2500), and one or more chain lengthening agents having molecular weights of from 32 to 349, wherein said polyurethane (a) contains ionic groups in a quantity of from about 0.1 to about 75 (preferably from 0.5 to 40) milliequivalents per 100 g of polyurethane (a) and from about 2 to about 70% by weight (preferably from 10 to 45% by weight), based on polyurethane (a), of polyethylene oxide units —$(CH_2CH_2O)_n$— in which the sequence length n is from 3 to about 55 (preferably from 4 to 25), or
  (b) a precursor that is reactive at elevated temperatures and capable of forming said polyurethane (a) prepared from
    (i) a blocked isocyanate prepolymer corresponding to said polyurethane (a), and
    (ii) a cross-linking agent; and
(B) optionally, one or more organic solvents in a quantity of up to 80% by weight, based on the sum of components (A) and (B).

DETAILED DESCRIPTION OF THE INVENTION

The reason that the effect obtained according to the invention is so surprising is that polyurethanes containing either the ionic groups alone or only the polyethylene oxide units of the type defined herein do not have a degree of permeability to water vapor that could be of practical use.

The polyurethane systems (A) may be prepared in known manner either solvent-free or, preferably, in an organic solvent, either by the so-called one-shot process or via an isocyanate prepolymer. In the last-mentioned variation, the isocyanate groups of the prepolymer may be blocked and the blocked isocyanate groups subsequently unblocked only after application of the coating composition to the substrate and may then be reacted with a suitable cross-linking agent (preferably a polyamine).

Polyurethanes (A), including the above-mentioned prepolymers, may be prepared from polyisocyanates corresponding to the formula $Q(NCO)_2$, in which Q stands for an aliphatic hydrocarbon group having 4 to 12 carbon atoms, a cycloaliphatic hydrocarbon group having 6 to 25 carbon atoms, an aromatic hydrocarbon group having 6 to 15 carbon atoms, or an araliphatic hydrocarbon group having 7 to 15 carbon atoms. Examples of preferred such diisocyanates include tetramethylene diisocyanate, hexamethylene diisocyanate, dodecamethylene diisocyanate, 1,4-diisocyanatocyclohexane, 3-isocyanatomethyl-3,3,5-trimethylcyclohexyl isocyanate (isophorone diisocyanate), 4,4'-diisocyanatodicyclohexylmethane, 4,4'-diisocyanatodicyclohexylpropane-(2,2), 1,4-diisocyanatobenzene, 2,4- and 2,6-diisocyanatotoluene, 4,4'-, 2,4'- and 2,2'-diisocyanatodiphenylmethane and mixtures of these isomers, 4,4'-diisocyanato-diphenylpropane-(2,2), p-xylylene diisocyanate, and $\alpha,\alpha,\alpha',\alpha'$-tetramethyl-m- or -p-xylylene diisocyanate, and mixtures of these compounds.

Aromatic polyisocyanates such as those described in some detail in U.S. Pat. Nos. 3,984,607 and 4,035,213, German Offenlegungsschrift 2,402,840 and German Auslegeschrift 2,457,387 are preferred. Particularly preferred are 2,4'- and 4,4'-diisocyanatodiphenylmehtane, the isomeric toluene diisocyanates, and, more preferably, mixtures of these diisocyanates. Isophorone diisocyanate and 4,4'-diisocyanatodicyclohexylmethane are particularly preferred cycloaliphatic diisocyanates.

The higher functional polyisocyanates known in polyurethane chemistry, as well as the known modified polyisocccyanates such as polyisocyanates containing carbodiimide groups, allophanate groups, isocyanurate groups, urethane groups, and/or biuret groups, may, of course, also be used.

Suitable components for the introduction of the polyethylene oxide units for synthesizing polyurethanes (a) include homopolyethylene glycols and ethylene oxide copolymers containing hydroxyl end groups (preferably 3 ethylene oxide/propylene oxide mixed ethers) in which the units are distributed in blocks or at random, under the condition that the ethylene oxide sequences satisfy the specified requirements of the present invention. Furthermore, polycarbonates and polyester esters based on the above-mentioned homopolyethylene glycols, ethylene oxide copolyethers, or mixtures thereof with other polyhydroxyl compounds which form polycarbonates or polyesters can be used. If the components used for introducing the polyethylene oxide units into polyurethane (a) or its precursors are mixed polyethers or polycarbonates or polyether esters based on such copolyesters, only those units which have the length of sequences according to the invention, whereas those polyethylene oxide sequences which have a length of sequence above or below the limits specified herein are omitted from the calculation.

Starting components for polyurethanes (a) providing the polyethylene oxide units include preferably ethylene oxide polyethers and ethylene oxide/propylene oxide copolyethers having 2 or 3 hydroxyl groups and containing a predominant proportion by weight of ethylene oxide units. Pure ethylene oxide polyethers are preferred.

The term "average molecular weights" for the purpose of this invention means molecular weights determined as number average molecular weights.

The optimum quantity of polyethylene oxide units in polyurethane (a) depends to some extent on the sequence length and follows the rule that if the sequence is short the quantity must be somewhat greater and if the sequence is long the quantity may be somewhat smaller. Thus, whereas polyurethane (a) may contain up to about 70% by weight of these polyethylene oxide units when the sequence length n is 3, it is advisable to limit the proportion of polyethylene oxide units in polyurethane (a) to about 30% by weight when the sequence length is above 20. If polyurethanes (a) having polyethylene oxide units with low and high sequence lengths are to be used, a proportion between the two aforesaid extremes will be chosen. If, for example, it is desired to use polyethylene oxide units having sequence lengths n of 3 and of 40, the proportion of units having the sequence length n of 40 should, if possible, not exceed 20% by weight when the proportion of units having the sequence length n of 3 amounts to 35% by weight.

The proportion of polyethylene glycols in a molecular weight range of from 150 to 2500 or the proportion of —$(CH_2CH_2-O)_n$— groups incorporated in diols, in which n may have a value from 3 to 22, may be from 4 to 100% by weight of the total quantity of macrodiols. This corresponds approximately to a proportion in the polyurethane of about 2 to 70% by weight (preferably from 10 to 45% by weight) when the sequence length is from 3 to about 55 (preferably from 4 to 25). The polyols which are used in addition to the components that provide the polyethylene oxide units defined herein may be selected from the usual isocyanate-reactive compounds used in polyurethane chemistry.

Suitable reactants for use with the polyisocyanates are thus mainly polyhydroxyl compounds containing from 2 to 8, preferably 2 or 3 hydroxyl groups per molecule and having an (average) molecular weight of up to about 10,000 (preferably up to 6000). Both low molecular weight polyhydroxyl compounds having molecular weights of from 62 to 499 and relatively high molecular weight polyhydroxyl compounds having average molecular weights of at least 500 (preferably not less than 1000) may be used, such as the known polyhydroxyl compounds described in detail, for example, in the above-mentioned publications.

Low molecular weight polyhydroxyl compounds ("chain lengthening agents") include a wide variety of diols, such as
a) alkane diols such as ethylene glycol, 1,2- and 1,3-propanediol, 1,4-butanediol, 1,5-pentanediol, dimethyl-1,3-propanediol, and 1,6-hexanediol;
b) ether diols such as diethylene glycol, triethylene glycol or 1,4-phenylene bis(β-hydroxyethyl ether);
c) ester diols corresponding to the general formulas HO—$(CH_2)_x$—CO—O—$(CH_2)_y$—OH and HO—$(CH_2)_x$—O—CO—R—CO—O—$(CH_2)_x$—OH in which
R denotes an alkylene or arylene group having 1 to 10 (preferably 2 to 6) carbon atoms,
x is 2 to 6, and
y is 3 to 5,
for examples δ-hydroxybutyl-ε-hydroxycaproic acid ester, ω-hydroxyhexyl-γ-hydroxybutyric acid ester, adipic acid β-hydroxyethyl ester, and terephthalic acid bis(β-hydroxyethyl)ester.

The "chain lengthening agents" may also include polyamines, preferably aliphatic or aromatic diamines, for example, ethylenediamine, propylene-1,2- and -1,3-diamine, 1,4-tetramethylenediamine, 1,6-hexamethylenediamine, 1,4-tetramethylenediamine, 1,6-hexamethylene diamine, N,N'-diisobutyl-1,6-hexamethylene diamine, 1,11-undecamethylene diamine, cyclohexane-1,3- and -1,4-diamine and mixtures thereof, 1-amino-3,3,5-trimethyl-5-aminomethylcyclohexane, 2,4- and 2,6-hexahydrotoluene diamine and mixtures thereof, perhydro-2,4'- and -4,4'-diaminodiphenylmethane and the 3,3'-dimethyl derivative thereof bis(3-aminopropyl) methylamine, p-xylylene-diamine, bis-anthranilic acid esters according to German Offenlegungsschriften 2,040,644 and 2,160,590, 3,5- and 2,4-diaminobenzoic acid esters according to German Offenlegungsschrift 2,025,900, the ester group-containing diamines described in German Offenlegungsschriften 1,803,635, 2,040,650, and 2,160,589, 3,3'-dichloro-4,4'-diaminodiphenylmethane, toluenediamine, 4,4'-diaminodiphenylmethane, and 4,4'-diaminodiphenyl disulfide.

Diamines suitable for the purpose of this invention also include hydrazine, hydrazine hydrate, and substituted hydrazines, such as methyl hydrazine, N,N'-dimethylhydrazine, and their homologs and acid dihydrazides, such as carbodihydrazide, oxalic acid dihydrazide, the dihydrazides of malonic acid, succinic acid, glutaric acid, adipic acid, β-methyladipic acid, sebacic acid, hydracrylic acid, and terephthalic acid, semicarbazido-alkylene hydrazides such as β-semicarbazidopropionic acid hydrazide (German Offenlegungsschrift 1,770,591), semicarbazido alkylene carbazic esters such as 2-semicarbazido ethyl carbazic ester (German Offenlegungsschrift 1,918,504), and amino-semicarbazide compounds such as β-aminoethyl-semicarbazido carbonate (German Offenlegungsschrift 1,902,931).

Relatively high molecular weight polyhydroxyl compounds include those known from polyurethane chemistry, such as hydroxy polyesters, hydroxy polyethers, hydroxy polythioethers, hydroxy polyacetals, hydroxy polycarbonates, and/or hydroxy polyester amides, preferably those having average molecular weights of from about 600 to about 4000 (most preferably from 800 to 2500). Polyether polyols and polyester polyols are particularly preferred. Particularly preferred are propylene oxide polyethers having an average of 2 to 3 hydroxyl groups per molecule and optionally containing polyethylene oxide units, as well as hydroxy polyesters having 2 to 3 hydroxy end groups and an average molecular weight of from about 1000 to about 6000 with melting points below 60° C.

Suitable hydroxyl group-containing polyesters include, for example, the reaction products of polyhydric (preferably dihydric) alcohols, optionally with the addition of trihydric alcohols, with polybasic (preferably dibasic) carboxylic acids. Instead using free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic, and/or heterocyclic and may be substituted (for example, by halogen atoms) and/or unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, terephthalic acid dimethyl ester, and terephthalic acid bis-glycol ester. Suitable polyhydric alcohols include ethylene glycol, pb 1,2- and 1,3-propanediol, 1,4- and 2,3-butanediol, 1,6-hexanediol, 1,8-octanediol, neopentyl glycol, cyclohexanedimethalol (i.e., 1,4-bis(hydroxymethyl)-cyclohexane), 2-methyl-1,3-propanediol, glycerol, trimethylolpropane, 1,2,6-hexanetriol, 1,2,4-butanetriol, trimethylolethane, pentaerythritol, quinitol, mannitol, soribol, methyl glycoside, diethylene glycol, triethylene glycol, tetraethylene glycol, dipropylene glycol, dibutylene glycol, and polybutylene glycols.

Mixtures of the above-mentioned polyether polyols with polyester polyols having average molecular weights of from 1000 to 3000 obtained from adipic acid, 1,6-hexanediol and neopentyl glycol are also particularly preferred.

Low molecular weight polyols having a molecular weight of less than about 300 of the type known as chain lengthening agents may also be included in the preparation of the isocyanate prepolymers. Among these 1,4-butanediol and trimethylolpropane are preferred.

The isocyanate prepolymers may be prepared in known manner by reacting the above-mentioned polyhydroxyl compounds with excess diisocyanate, preferably at about 70° to about 100° C. An NCO/OH ratio of from about 1.5:1 to about 6.0:1 (preferably from 1.7:1 to 2.5:1) is generally used for this purpose.

Examples of compounds that are suitable blocking agents for the isocyanate prepolymers include ketoximes of hydroxylamine and ketones such as acetone, methyl ethyl ketone, diethyl ketone, cyclohexanone, acetophenone, and benzophenone. Methyl ethyl ketone oxime (i.e., butanone oxime) is a preferred blocking agent. Other blocking agents are in principle also suitable, for example, those described in *Methoden der Organischen Chemie*, (Houben-Wey), Volume 14/2, 4th Edition, Georg Thieme Verlag, Stuttgart (1963), pages 61 et seq.

The blocking reaction may be carried out by reacting the isocyanate prepolymer with equivalent quantities of ketoxime at an elevated temperature (e.g., at about 70° to about 100° C.) until the isocyanate groups have disappeared.

Such blocked isocyanate propolymers have been described, for example, in German Offenlegungsschrift 2,902,090.

The blocked prepolymers may be mixed with organic solvents to adjust them to optimum viscosity. Because the isocyanate groups are blocked, it is not essential to use solvents that are inert towards free isocyanate groups. Examples of suitable solvents include alcohols such as isopropyl alcohol, ethers such as ethylene glycol monomethyl and monethyl ethers, ester such as ethyl and butyl acetate and the acetic acid esters of ethylene glycol monomethyl and monoethyl ethers, ketones such as methyl ethyl ketone and cyclohexanone, and amides such as N,N-dimethylformamide, N,N-dimethylacetamide, and N-methylpyrrolidone.

The cross-linking component (b)(ii) for the blocked isocyanate prepolymers may in principle be any polyfunctional compound capable of reacting with the blocked isocyanate groups (after they have been deblocked), especially polyamines (preferably diamines such as those described above as chain lengthening agents). Isophorone diamine, among others, is also suitable. A preferred diamine is 4,4'-diamino-3,3'-dimethyldicyclohexylmethane, which is an aliphatic diamine that has a very low vapor pressure and is liquid at room temperature.

The blocked isocyanate prepolymers are generally mixed with the cross-linking agent in approximately equivalent weights of these components, although sub-cross-linking may be suitable for certain purposes. The equivalent ratio of blocked isocyanate groups to cross-linking groups (preferably $NH_2$ groups) is therefore generally from about 1.35:1 to about 0.95:1 (preferably from 1.25:1 to 1:1).

The sub-groups of Component (A) all have the capacity for film formation.

It is advisable to dissolve component (A) in an organic solvent if it has not already been prepared in such a solvent. These solutions may have a solids content of from about 10 to about 98% by weight (preferably from 20 to 50% by weight). High solids contents are possible especially when prepolymers are used. Suitable solvents include aromatic solvents such as toluene and xylenes and the solvents listed above with respect to the blocked prepolymers.

Ionic groups for the polyurethanes (a) include alkali metal and ammonium carboxylate and sulfonate groups and ammonium groups. Suitable components for the incorporation of these groups into the polyurethane (a) therefore include dihydroxycarboxylic acids, diaminocarboxylic acids, and diaminoalkylsulfonic acids and their salts, for example, dimethylol-propionic acid, ethylene diamino-β-ethylsulfonic acid, ethylene diaminopropyl- or -butylsulfonic acid, 1,2- or 1,3-propylene diamino-β-ethylsulfonic acid, lysine, 3,5-di-aminobenzoic acid, and their alkali metal and/or ammonium salts, as well as the adduct of sodium bisulfite and 2-butene-1,4-diol.

The preferred components for the introduction of ionic groups into the polyurethanes (a) include in particular the sulfonate group-containing aliphatic diols described in German Offenlegungsschrift 2,446,440 corresponding to the formula

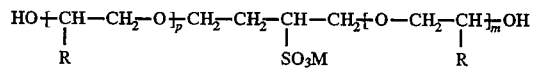

wherein

R denotes hydrogen or an organic group (preferably alkyl) having 1 to 8 carbon atoms, m and p independently denote numbers from 1 to 10, and M denotes an ammonium cation or the cation of an alkali metal, and the propoxylated product of addition of sodium bisulfite to butene-1,4-diol; as well as the cationic or anionic internal emulsifiers that can be incorporated as described in German Offenlegungsschrift 2,651,506, and diaminosulfonates of the formula

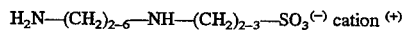

or diaminocarboxylates of the formula

In general, the components used for introduction of the ionic groups into the polyurethanes (a) may be cationic and/or anionic hydrophilic difunctional starting components of the type described for the preparation of aqueous polyurethane dispersions, such as, for example, dihydroxyl compounds, diamines, or diisocyanates containing ionic groups (e.g., tertiary amino groups that are converted into ammonium groups when acidified or alkylated).

The polyurethanes (a) may also be synthesized by reacting the blocked isocyanate prepolymers (i) with cross-linking agents (ii) that are modified by cationic and/or anionic groups.

Other starting components for the preparation of the polyurethanes (a) include preferably chain lengthening agents having molecular weights of from 60 to 299 containing about 1 to 4 hydroxyl or amino groups.

Chain lengthening agents containing hydroxyl groups include diols such as ethanediol, 1,4- and 1,3-butanediol, 1,6-hexanediol, and hydroquinone dihydroxyethyl ether. Polyols such as trimethylolpropane may be included as branching components.

Diamines may also be used as chain lengthening agents. Suitable diamines are preferably aliphatic or cycloaliphatic diamines, although trifunctional or higher functional polyamines may also be included for obtaining a certain degree of branching. Examples of suitable aliphatic polyamines include ethylene diamine, trimethylene diamine, tetramethylene diamine, hexamethylene diamine, propylene-1,2-diamine, the isomeric mixture of 2,2,4- and 2,4,4-trimethylhexamethylene diamine, and bis-(β-aminoethyl)amine (i.e., diethylene triamine).

The following are examples of suitable cycloaliphatic polyamines:

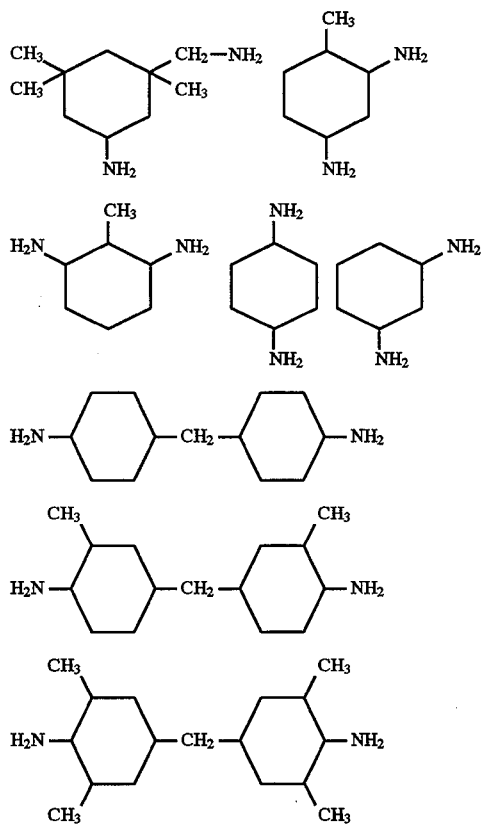

Araliphatic polyamines, such as 1,3- and 1,4-xylylene diamine or α,α,α',α'-tetramethyl-1,3- and -1,4-xylylene diamine, may also be used as chain lengthening agents for the preparation of polyurethanes (a).

Oligomeric compounds containing polysiloxane segments and having at least two isocyanate reactive groups and molecular weights of from about 300 to about 6000 (preferably from 500 to 1500) may be used for modifying certain properties of the coatings prepared according to the invention, such as their handle and surface smoothness. Difunctional polysiloxanes having organofunctional end groups are preferred. These compounds have structural units of the formula —O—Si(R)$_2$—, where R denotes a C$_1$–C$_4$-alkyl group or a phenyl group, preferably a methyl group.

The quantities of these or other auxiliaries usually do not exceed 20% by weight, preferably 10% by weight, based on component (A).

The polyurethanes (a) may, for example be prepared in solution. E.g., German Offenlegungsschrift 3,736,642.

The polyurethanes (a) may in principle also be prepared solvent-free by known methods, using suitable mixing apparatus such as reaction screws, and the solid substances obtained on cooling (e.g., in the form of granulates) may be dissolved in solvents to produce the coating compositions according to the invention.

The optional solvents (B) may be highly polar, volatile organic compounds such as dimethylformamide, diethylacetamide, dimethylsulfoxide, and N-methylpyrrolidone. Mixtures of these highly polar solvents with only slightly polar solvents, such as aromatic hydrocarbons, esters, and ketones, may also be used. Mixtures of only slightly polar solvents, in most cases mixtures of alcohols and esters, ketones, or aromatic hydrocarbons, are preferred. Examples include toluene, xylene, ethylbenzene, higher alkylated aromatic compounds known as solvent naphtha, ethyl acetate, ethylene glycol monomethyl and monoethyl ether acetate, propylene glycol monomethyl and monoethyl ether acetate, butyl acetate, ethanol, isopropyl alcohol, butanol, isobutyl alcohol, the isomers of amyl alcohol, cyclohexanol, diacetone alcohol, acetone, methyl ethyl ketone, and methyl isobutyl ketone. Preferred mixtures are those of aromatic compounds and alcohols, especially mixtures of toluene and the isomers of butanol.

The quantity of solvent (B) depends to a large extent on whether the polyurethane (a) is used as such or as the corresponding precursor (b) containing blocked isocyanate prepolymer (i) and cross-linking agent (ii). When polyurethanes (a) are used, the solvent content will not be about 80% by weight and not below 40% by weight, whereas when precursor products (b) are used, the solvent content is generally from 0 to 20% by weight.

The coating compositions according to the invention contain less than about 5% by weight of water, based on the sum of components (A) and (B).

The viscosity of the coating compositions according to the invention is generally 10,000 to 120,000, preferably 20,000 to 90,000 mPa.s, measured at 25° C.

The coating compositions according to the invention are as a rule applied to a flexible substrate, preferably a textile substrate, without further additives. The compositions may be directly spread coated on the substrate by means of coating knives, rollers, or wire coaters. Several coats are generally applied in succession (preferably two coats), so that the total thickness of the coating composed of primer and top coat(s) is from about 10 to about 100 μm (preferably 20–60 μm). the primer used may also be a paste that dries to form a microporous layer, as described in German Offenlegungsschrift 2,020,153. The top coat subsequently applied protects the whole composite material against mechanical forces and abrasions.

Application of the composite coating of primer and top coat may also be carried out by the so-called reversal process. In this process, the top coat is first applied to a separating support and dried. After the application of a second coat serving as primer or bonding coat, the textile substrate is lightly pressed into the still moist layer. A solid composite layer of coating and substrate is obtained after drying. This composite is detached from the separating support and substantially corresponds to structure to the direct coating described above.

The coatings, which are exceptionally permeable to water vapor and resistant to droplets, may also be prepared from solutions containing pigments and/or dyes. Agents that provide hydrophobic properties, such as fluorocarboxylic resins, waxes, and oils, may also be added, provided they do not unduly reduce the permeability to water vapor. Cross-linking additives that enter into a reaction with themselves or the polyurethane only after the coating has been applied, generally by the action of heat, may also be added. Compounds of this type include (partially) etherfied melamine formaldehyde resins (e.g., hexamethylolmelamine), and optionally blocked polyisocyanates having 3 or more isocyanate groups (e.g., tris(isocyanatohexyl)isocyanurate and tris(isocyanatohexyl)biuret).

The invention further relates to the use of the coating compositions described above for the preparation of coatings that are permeable to water vapor, in particular on flexible substrates such as textiles, leather, paper, and the like.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise note, all temperatures are degrees Celsius and all parts and percentages are parts by weight and percentages by weight respectively.

EXAMPLES

The 50% primer paste of German Offenlegungsschrift 3,736,652, Example 3, was prepared as follows:

1000 g of a polycarbonate based on diphenyl carbonate and a dihydroxyl ester of 1 mol of hexane-1,6-diol and 1 mol of caprolactone (OH number: 56; molecular weight 2000) and 1000 g of polyethylene glycol polyether (OH number: 56; molecular weight: 2000; started on ethylene glycol) were dehydrated in a water jet vacuum and, after the addition of a mixture of 255.3 g of 3-isocyanatomethyl-3,5,5-trimethyl cyclohexyl isocyanate (IPDI) and 62.2 g of hexamethylene diisocyanate, were stirred at 100° C. until the NCO content of the mixture had fallen below 1.9%. the isocyanate prepolymer formed was dissolved in 1165 g of toluene. 19 g of hydrazine hydrate were mixed with 1165 g of t-butanol and the resulting mixture was slowly added to the prepolymer solution which was stirred at approximately 25° to 30° C. the viscosity increased toward the end of the reaction. The addition was stopped when the viscosity exceeded 40,000 mPa·s·3.5 g butanone oxime were then added, followed by stirring for 30 minutes. A 50% solution of the polyurethane polyurea was obtained.

The percentage elongation at break was measured according to the August 1975 edition of DIN 53504 except that the test specimens employed differed in thickness from the standard bar S2 but otherwise had the same measurements; the thickness was 0.1 mm (cast film).

EXAMPLE 1 a) Preparation of the polyurethane

The following macrodiols were used:

Diol I: A polycarbonate diol of 1,6-hexanediol having an average molecular weight of 2000 and a hydroxyl number 56.

Diol II: A polyether polyol also having the hydroxyl number 56 prepared by first preparing an oligopropylene oxide from propylene oxide starting on 1,2-propanediol and then preparing a mixed block of ethylene oxide and propylene oxide and then forming end groups of about 3 ethylene oxide units at the end of the molecules by a reaction with ethylene oxide. The molar ratio of ethylene oxide/propylene oxide in the whole structure is 1:1.

Diol III: A diol containing sulfonate groups obtained by the reaction of $NaHSO_3$ with butene-1,4-diol followed by propoxylation up to a molecular weight of about 425.

The polyurethane was obtained by reacting the following components at 60° to 80° C.:

0.5 mol of Diol I 0.5 mol of Diol II 0.6 mol of Diol III 2.4 mol of 1,4-butanediol about 4 mol of diphenylmethane-1,4-diisocyanate ("MDI")

the polyurethane was dissolved in a 2:1 DMF/toluene mixture (parts by weight). the 30% solution had a viscosity of 27,000 mPa·s. The $SO_3^{(-)}$ content in the polyurethane was about 1.73 mVal in 100 g. The —$(CH_2$—$CH_2O)_3$— content (introduced as end groups in Diol II (calculated)) was about 3.8% by weight.

b) Determination of the permeability to water vapor (measured according to the conditions laid down in publication DS 2109 TM1 of British Textile Technology Group, Manchester, England)

A self-support film 53 μm in thickness cast from the solution from a) had a permeability to water vapor of 7400 $g/m^2 \cdot d$. By comparison, a self-supporting film 48 μm in thickness produced from a solution in which the polyurethane only contained 1,4-butanediol instead of the corresponding molar quantity of the propoxylated adduct of butene-1,4-diol and $NaHSO_3$ (in other words, free from ionic groups) had a permeability to water vapor of only 290 $g/m^2 \cdot d$. Elongation at break: 560% (thickness: 0.1 mm).

EXAMPLE 2 a) Preparation of the polyurethane solution:

The anhydrous diol component mixture consisting of 86.5 g of polycarbonate (OH number 56, molecular weight about 2000) prepared from tetraethylene glycol and 1,6-hexanediol (1:1 molar) and diphenyl carbonate, 96.5 g of a mixed ether of ethylene oxide and propylene oxide (1:1 molar) started on ethylene glycol (OH number 56, molecular weight about 2000; i.e., Diol II from Example 1), 22 g of a propoxylated adduct of butene-1,4-diol and $NaHSO_3$ (molecular weight 425; i.e., Diol III from Example 1), and 18.7 g of 1,4-butanediol was dissolved in 233 g of toluene and 467 g of dimethylformamide.

86.5 g of 4,4'-diisocyanatodiphenylmethane (MDI) were then added at 60° to 80° C. The solution was stirred until no more isocyanate could be detected by IR spectroscopy. 0.5 g portions of MDI were then added gradually and stirred until the free isocyanate groups disappeared. Addition of MDI was repeated until the viscosity of the 30% solution was about 10,,, mPa·s.

A self-supporting film 47 μm in thickness cast from this solution had a permeability to water vapor of 15,400 $g/m^2 \cdot d$. By comparison, a self-supporting film 40 μm in thickness which had been prepared from a solution in which 5 the polyurethane only contained 1,4-butanediol instead of the corresponding molar quantity of the propoxylated adduct of butene-1,4-diol and $NaHSO_3$ (and is therefore free from ionic groups) had a permeability to water vapor of 1270 $g/m^2 \cdot d$. The elongation at break of a film with a thickness of 0.1 mm was 620%.

For further comparison, a polyurethane which contained ionic groups but no ethylene oxide units was also prepared. In this case, the polycarbonate containing tetraethylene glycol and the polyether Diol II used in the above formulation were replaced by the corresponding molar quantity of Diol I. All other components were left the same. A cast, self-supporting film of this polyurethane 56 μm in thickness had a permeability to water vapor of only 160 g/m²·d.

b) Preparation of a coating article by the transfer process:

The solution described under a) was applied to a commercial matt separating paper by doctor knife using a gap of <0.08 mm and dried at 80° to 150° C.

A primer paste prepared from 1000 g of the 50% primer solution described in German Offenlegungsschrift 3,736,652 (Example 3) to which had been added 40 g of a cross-linking agent based on a 70% solution in isobutyl alcohol of a hexamethoxy/butoxy melamine resins for cross-linking and 10 g of a 20% solution in isopropyl alcohol of p-toluenesulfonic acid as catalyst was applied to this top coat with a doctor knife using a gap of <0.1 mm. A cotton fabric weight 160 g/m² was laminated to this coat. Cross-linking of the primer coat takes place at 140° C. The whole composite coating had a solids contents of about 60 g/m².

The article obtained, which was soft and permeable to water vapor, had the following fastness properties:

Permeability to water vapor: 9800 g/m²·d

Water column: 2000 mm

3×washing: 2000 mm

3×dry cleaning: 2000 mm

When water droplets were applied to the upper surface of the coating for 1 to 5 minutes, no pustular changes in the surface were observed.

By contrast, the permeability to water vapor of a similar article coated with the comparison product that was free from sulfonate groups and had a solids content of 64 g/m² was 1800 g/m²·d. When a similar article was produced as described above from the polyurethane that was free from ethylene oxide groups and contains only ionic groups, the permeability to water vapor of a coating having a solids content of 64 g/m² was only 390 g/m²·d.

EXAMPLE 3 a) a polyurethane solution was prepared from the following components by the procedure of Example 2a):

89 g a polycarbonate diol (OH number about 56, molecular weight about 2000) prepared from tetraethylene glycol and diphenyl carbonate 89 g a copolyether of ethylene oxide/propylene oxide (1:1 molar) (OH number 56, molecular weight 2000) started on ethylene glycol; Diol II from Example 1

11.3 g the propoxylated adduct of butene-1,4-diol and NaHSO₃ (molecular weight 425); Diol III from Example 1

21.7 g 1,4-butanediol ca. 89 g 4,4'-diisocyanatodiphenylmethane 467 g dimethylformamide 233 g toluene A self-supporting film 48 μm in thickness produced from this solution had a permeability to water vapor of 8300 g/m²·d. The elongation at break of a film with a thickness of 0.1 mm was 690%.

By contrast, the corresponding comparison product that was free from sulfonate groups had a permeability to water vapor as a self-support film 44 μm in thickness of 900 g/m²·d.

b) A coating produced analogously to Example 2b) by the transfer process having a solids content of 75 g/m² gave rise to a soft article having a permeability to water vapor of 7600 g/m²·d. This coating also showed no pustular changes on the surface when subjected to the action of water droplets and had good fastness properties for use.

By contrast, a corresponding article coated with the comparison product that was free from sulfonate groups had a permeability to water vapor of 1250 g/m²·d when the coating was applied in a thickness corresponding to 65 g/m².

EXAMPLE 4 a) A polyurethane solution was prepared from the following components by the procedure of Example 2a):

87.7 g a polycarbonate diol (OH number 56, molecular weight about 2000) prepared from tetraethylene glycol and diphenyl carbonate 87.7 g a copolyether of ethylene oxide/propylene oxide (1:1 molar) (OH number 56, molecular weight 2000) started on ethylene glycol; Diol II from Example 1

16.8 g the propoxylated adduct of butene-1,4-diol and NaHSO₃ (molecular weight 425); Diol III from Example 1

20.1 g 1,4-butanediol ca. 88 g 4,4'-diisocyanatodiphenylmethane 233 g toluene 467 g dimethylformamide A self-supporting film 45 μm in thickness produced from this solution had a permeability to water vapor of 5300 g/m²·d. The elongation at break of a film with a thickness of 0.1 mm was 660%.

The corresponding comparison product free from sulfonate groups had a permeability to water vapor of 250 g/m²·d as a self-supporting film 49 μm in thickness.

b) The coating article produced analogously to Example 2b) by the transfer process and weighing 78 g/m² resulted in a soft article having a permeability to water vapor of 4200 g/m²·d and good fastness properties in use. Again no pustular changes were found on the surface when this cating was subjected to the action of water droplets.

The analogous comparison product without sulfonic acid groups had a permeability to water vapor of 440 g/m²·d when applied in a thickness corresponding to 68 g/m².

EXAMPLE 5 a) A polyurethane solution was prepared from the following components by a procedure analogous to that of Example 2a):

45.5 g a polycarbonate diol (OH number about 56, molecular weight about 2000) prepared from 1,6-hexanediol and diphenyl carbonate 105 g octaethylene glycol (molecular weight about 370)

28.9 g the propoxylated adduct of butene-1,4-diol and NaHSO₃ (molecular weight 425); Diol III from Example 1

7.2 g 1,4-butanediol 113.5 g 4,4'-diisocyanatodiphenylmethane 467 g dimethylformamide 233 g toluene A self-supporting film 48 μm in thickness produced from this solution had a permeability to water vapor of 12,3000 g/m²·d. The elongation at break of a film with a thickness of 0.1 mm was 460%.

The corresponding comparison product that was free from sulfonate groups had a permeability to water vapor of only 340 g/m²·d as a self-supporting film 45 μm in thickness.

b) When a coating article was produced analogously to Example 2b) by the transfer process, it had a permeability to water vapor of 7350 g/m²·d when applied in a thickness corresponding to 76 g/m².

The article again showed no pustular change on the surface when exposed to the action of a water droplet.

The analogous comparison article having no sulfonate groups in the polyurethane had a permeability to water vapor of only 900 g/m²·d when applied in a thickness corresponding to 60 g/m².

EXAMPLE 6 a) Preparation of the polyurethane urea solution 201.9 g of polycarbonate prepared from tetraethylene glycol/1,6-hexanediol (1:1 molar) and diphenyl carbonate (OH number 56, molecular weight about 2000) and 22.4 g of a copolyether of ethylene oxide/propylene oxide (1:1 molar) started on ethylene glycol (OH number 56, molecular weight about 2000; Diol II from Example 1) were stirred together with 39.9 g of 3-isocyanatomethyl-3,5,5-trimethylcyclohexylisocyanate ("IPDI") and 15.1 g of hexamethylene diisocyanate ("HDI") at about 50° C. and the mixture was then heated to 100° C. and stirred at this temperature until the isocyanate value was slightly below the theoretical value. The prepolymer was cooled to 20° C. and diluted with 315 g of toluene, 107 g of isopropyl alcohol, and 70 g of methoxypropanol. The subsequent operations should be carried out as rapidly as possible. A solution of 8.6 g of 3-aminomethyl-3,5,5-trimethylcyclohexylamine ("IPDA"), 2.5 g of hydrazine hydrate, and 10.5 g of ethylene diaminoethylsulfonic acid sodium in 180 g of isopropyl alcohol/28 g of water was added dropwise at 25° C. up to a maximum of 30° C. and the viscosity was adjusted to 30,000–40,000 mPa·s. A self-supporting film 48 μm in thickness cast from this solution had a permeability to water vapor of 15,900 g/m²·d. The elongation at break of a film with a thickness of 0.1 mm was 730%.

By comparison, a self-supporting film 42 μm in thickness prepared from a solution whose polyurethane(urea) contains hydrazine and IPDA (1:1) instead of the corresponding molar quantity of ethylene diaminoethylsulfonic acid sodium had a permeability to water vapor of only 1630 g/m²·d. b) A coating article prepared analogously to Example 2b) by the transfer process and forming a layer weighing 78 g/m² resulted in a soft article permeable to water vapor having the following fastness properties:

Permeability to water vapor: 9700 g/m²·d

Water Column:

Original: 2000 m

3×washing 2000 mm

3×dry cleaning 2000 mm

Bally Flexometer Room temperature: 150,000 buckling movements

−10° C: 30,000 buckling movements

Drop test:

When the upper surface of the coating was exposed to the action of water droplets for 1 to 5 minutes, no pustular change in the surface was observed.

By contrast, the permeability to water vapor of the corresponding article produced from the comparison product that was free from sulfonate groups had a permeability to water vapor of only 1900 g/m²·d as a layer weighing 78 g/m².

EXAMPLE 7 a) Preparation of the polyurethane solution:

51.9 g of an isomeric mixture of 2,4- and 2,6-toluene diisocyanate (65.35 parts by weight) were stirred at room temperature with 213 g of a polycarbonate (OH number 56, molecular weight about 2000) prepared from tetraethylene glycol, 1,6-hexanediol (1:1 molar), and diphenyl carbonate, 213 g of a mixed ether of ethylene oxide and propylene oxide (1:1) (OH number 56, molecular weight about 2000) started on ethylene glycol; Diol II from Example 1), 3.9 g of 1,4-butanediol and 18.2 g of propoxylated adduct of butene-1,4-diol and NaHSO₃ (molecular weight 425; Diol III from Example 1). The mixture was heated to 80° C. within 30 minutes. After about 1 to 2 hours, the mixture was diluted portionwise as required with a total of 350 g of toluene and 150 g of methyl ethyl ketone. Stirring of the solution was continued until it had a viscosity of from 20,000 to 35,00 mPa·s at 23° C. When the isocyanate was used up before the desired viscosity was obtained (no isocyanate band in the IR), further isocyanate was added in 1 g portions. Excess isocyanate was blocked by the addition of butanone oxime. A self-supporting film cross-linked with resin and having a thickness of 45 μm cast from this solution had a permeability to water vapor of 17,8000 g/cm²·d. The elongation at break of a film with a thickness of 0.1 mm was 500%. By comparison, a self-supporting film cross-linked with resin and 43 μm in thickness produced from a solution whose polyurethane contained only 1,6-hexanediol instead of the corresponding quantity of the propoxylated adduct of butene-1,4-diol and NaHSO₃ (and was therefore free from ionic groups) had a permeability to water vapor of 8900 g/m²·d.

b) Preparation of a coating article by the transfer process:

The solution from Example 2a) was spread by doctor knife on a commercial separating paper, using a gap of <0.08 mm, and dried at 80° C. to 150° C. The primer paste prepared from 1000 g of the 50% primer solution described under a) to which had been added 40 g of a cross-linking agent based on a hexamethoxy/butoxy-melamine resin in the form of a 70% solution in isobutyl alcohol for cross-linking and 10 g of a 20% solution of p-toluenesulfonic acid in isopropyl alcohol as catalyst was applied to this top coat by doctor knife using a gap of <0.1 mm. A cotton fabric weight 160 g/m² was laminated thereto.

The article thus obtained was soft and had a permeability to water vapor of 9400 g/m²·d as well as other good fastness properties in use.

When the upper surface of the coating was subjected to the 3 action of water droplets for 1 to 5 minutes, no pustular change in the surface was observed.

By contrast, the permeability to water vapor of the corresponding article containing the sulfonate-group-free comparison products described in Example 2 and under 7a) was 1400 g/m²·d.

c) Preparation of a coating article by the direct process:

A polyamide fabric weighing about 100 g/m² was primed with the primer paste described under b) and dried and crosslinked at temperatures of 20° C./120° C./150° C. The coating had a weight when dry of 15 g/m². A second or final coat was prepared with the solution described in Example 6a) of a one-component aliphatic polyurethane urea. Drying temperature was 90° C./120° C., resulting in a total weight of coating (dry) of 22 g/m². The permeability to water vapor is 6900 g/m²·d.

When the upper surface of a coating was subjected to the action of water droplets for 1 to 5 minutes, no pustular change in the surface was observed.

By contrast, the corresponding article produced from the comparison products described in Examples 7a) and 6a), which were free from sulfonate groups, had a permeability to water vapor of 700 g/m²·d.

EXAMPLE 8 High solid polyurethane permeable to water vapor a) Preparation of the butanone oxime-blocked prepolymers:

200 g of a polyether based on trimethylolpropane and propylene oxide having a molecular weight of 6000, 1000 g of a linear polyether based on propylene glycol and propylene oxide having a molecular weight of 1000, 1700 g of a linear polycarbonate of tetraethylene glycol having a molecular weight of 2000, and 106 g of a propoxylated product of addition of NaHSO₃ to butene-1,4-diol having a molecular weight of 425 (Diol III from Example 1) were reacted with 1125 g of 4,4'-diisocyanatodiphenylmethane and 174 g of 2,4-diisocyanatotoluene from about 3 hours at 80°–90° C. until the isocyanate content was just below the calculated 4.05% by weight. 496 g of butanone oxime and 733 g of propylene glycol monomethyl ether acetate were then rapidly stirred in at 60°–70° C. No isocyanate could be detected by IR spectroscopy after 20 minutes. The blocked isocyanate prepolymer, which was a liquid having a viscosity of about 40,000 mPa·s at 20° C., had a determinable latent isocyanate content of 3.1% by weight.

b) Preparation of the film:

400 g of the butanone oxime-blocked prepolymer were stirred with 35 g of 4,4'-diamino-3,3'-dimethyldicyclohexylmethane. A film was produced by means of a coating roller and was predried at 90° C. and subjected to the cross-linking reaction at 140°–160° C. with liberation of butanone oxime.

The self-supporting elastic film had a weight of 60 g/m². The permeability to water vapor was 5300 g/m²·d. The elongation at break of a film of a thickness of 0.1 mm was 400%.

A comparable film of the same thickness that had been prepared according to German Patentschrift 2,902,090 from the prepolymer B described therein and was free from tetraethylene glycol and propoxylated diol sulfonate had a permeability to water vapor of only 600 g/m²·d.

EXAMPLE 9 a) Preparation of the polyurethane 60.5 g of the polycarbonate diol of 1,6-hexanediol having an average molecular weight of 2000 and a hydroxyl number of 56 (Diol I), 8.6 g of a polyethylene oxide also having a hydroxyl number of 56 and a molecular weight of 2000, 103.7 g of the polyether (Diol II) of ethylene oxide/propylene oxide (1:1 molar) having a hydroxyl number of 56, 18.7 g of 1,4-butanediol, and 22 g of the propoxylated reaction product of NaHSO₃ with butene-1,4-diol (Diol III) were dissolved in 233 g of toluene and 467 g of dimethylformamide.

86.5 g of 4,4'-Diisocyanatodiphenylmethane (MDI) were then added at 60° to 80° C. The solution was stirred until no isocyanate could be detected by IR spectroscopy. When necessary, 0.5 g portions of MDI were then added gradually and the mixture was stirred until the free isocyanate groups disappear. This procedure was repeated until the viscosity of the 30% solution was about 20,000 mPa·s.

A self-supporting film 45 µm in thickness cast from this solution had a permeability to water vapor of 14,800 g/m²·d. The elongation at break of a film with a thickness of 0.1 mm was 700%. By comparison, a self-supporting film 42 µm in thickness produced from a solution whose polyurethane contained only 1,4-butanediol instead of the corresponding quantity of Diol III (and was therefore free from ionic groups) had a permeability to water vapor of 1300 g/m²·d.

b) Preparation of a coating article by the transfer process

The solution described under a) was applied to a commercial matt separating paper by means of a doctor knife using a gap of <0.08 mm and dried at 80°–150° C. The primer paste analogous to that of Example 2b) was then applied to this top coat. A cotton fabric weighing 160 g/m² was laminated thereto. Cross-linking of the primer coat took place at 140° C. The whole coating had a solids content of about 60 g/m².

The soft article, which was permeable to water vapor, had the following fastness properties:

Permeability to water vapor: 9900 g/m²·d

Water column: 2000

3×Washing: 2000 mm

3×Dry cleaning: 2000 mm

Bally Flexometer

Room temperature: 150000 buckling movements

−10° C.: 30000 buckling movements

When the upper surface of the coating was subjected to the action of water droplets for 1–5 minutes, no pustular changes in the surface were observed.

By contrast, a similar article obtained from the comparison product that was free from sulfonate groups had a permeability to water vapor of 2900 g/m²·d. c) If the polyurethane described under a) was prepared solvent-free, using a reaction screw, and then dissolved to form a 30% solution in toluene/DMF (1:2 parts by weight), a self-supporting film 44 µm in thickness cast from this solution had a permeability to water vapor of 14,3000 g/m²·d.

EXAMPLE 10 a) Preparation of the polyurethane

The procedure was analogous to that described in Example 9a) but instead of using the polycarbonate diol of 1,6-hexanediol (Diol (), 60.5 g of the polycarbonate diol of tetraethylene glycol/1,6-hexanediol (1:1 molar) having an average molecular weight of 2000 and hydroxyl number 56 were used.

A self-supporting film 52 µm in thickness cast from this 30% solution had a permeability to water vapor of 15,900 g/m²·d. The elongation at break of a film with a thickness of 0.1 mm was 590%.

b) Preparation of a coating article by the transfer process:

When a coating article having a solids content of about 60 g/m² was prepared analogously to Example 9b) with top coat solution a), a soft article permeable to water vapor and having the following fastness properties was obtained:

Permeability to water vapor: 10500 g/m²·d
Water column: 2000 mm
3×Washing: 2000 mm
3×Dry cleaning: 2000 mm
Bally Flexometer
Room temperature: 150000 buckling movements
−10° C.: 30000 buckling movements.

This article was also resistant to topical conditions.

EXAMPLE 11 a) Preparation of the polyurethane urea solution 112.9 g of an adipic acid polyester of 1,6-hexanediol and neopentyl glycol (2:1 molar) having a molecular weight of 2000 and a hydroxyl number of 56, 60.5 g of a polyethylene oxide also having a hydroxyl number of 56 and a molecular weight of 2000, and 8.5 g of a silicone containing 6% of OH groups and having a molecular weight of about 600 were stirred together with 76.1 g of 3-isocyanatomethyl-3,5,5-trimethylcyclohexylisocyanate ("IPDI") at about 50° C. and then heated to 100° C. and stirred at this temperature until the isocyanate content was slightly below the theoretical isocyanate value.

The prepolymer was cooled to 20° C. and diluted with 404 g of toluene and 108 g of isopropyl alcohol. Subsequent processing must be carried out as quickly as possible. A solution of 32.5 g of 3-aminomethyl-3,5,5-trimethylcyclohexylamine ("IPDA") and 9.5 g of the sodium salt of ethylene diaminoethylsulfonic acid in 150 g of isopropyl alcohol/38 g of water was added dropwise at 25° C. up to a maximum of 30° C. and the viscosity was adjusted to 10,000–15,000 mPa·s.

A self-supporting film 43 μm in thickness cast from this 30% solution had a permeability to water vapor of 15,200 g/m²·d. The elongation at break of a film with a thickness of 0.1 mm was 490%.

By comparison, a film 44 μm in thickness produced from a solution whose polyurethane urea contained IPDA instead of the corresponding molar quantity of the sodium salt of ethylene diaminoethylsulfonic acid had a permeability to water vapor of only 1600 g/m²·d.

b) Preparation of a coating article by the transfer process:

When a coating article having a solids content of about 60 h/m² was prepared analogously to Example 9b using top coat solution a), the article obtained had a permeability to water vapor of 9500 g/m²·d.

When the upper surface of the coating was subjected to the action of water droplets for 1–5 minutes, no pustular change in the surface was observed.

EXAMPLE 12

Preparation of a polyurethane urea solution

The procedure was analogous to that of Example 6a) but the sodium salt of ethylene diaminoethylsulfonic acid was replaced by 8.5 g of the sodium salt of ethylene diaminoethylcarboxylic acid. The 30% solution was again adjusted to a viscosity of from 30,000 to 40,000 mPa·s.

A self-supporting film 45 μm in thickness cast from this solution had a permeability to water vapor of 16,600 g/m². The elongation at break of a film with a thickness of 0.1 mm was 640%. By comparison, a self-supporting film 42 μm in thickness that had been produced from a solution in which the polyurethane urea did not contain the sodium salt of ethylene diaminoethylcarboxylic acid but instead contained the corresponding molar quantity of hydrazine and IPDA (1:1) had a permeability to water vapor of only 1630 g/m²·d.

What is claimed is:

1. A coating composition for the preparation of water-vapor permeable coatings comprising (A) a polyurethane system containing either
    (a) a polyurethane having an elongation at break (according to DIN 53,504) of from 200 to 1000% and containing ionic groups in a quantity of from 0.5 to 40 milliequivalents per 100 g of polyurethane (a) and from 10 to 45% by weight, based on polyurethane (a), of polyethylene oxide units —$(CH_2CH_2O)_n$— in which the sequence length n is from 3 to 55, prepared from
        (1) one or more polyisocyanates,
        (2) one or more hydroxyl-terminated polyethers having number average molecular weights of from 350 to 5000 selected from the group consisting of
            (i) a homopolyethylene glycol or an ethylene oxide/propylene oxide copolymer containing 2 or 3 hydroxyl end groups and having polyethylene oxide units distributed in blocks or at random,
            (ii) a polycarbonate or polyether ester based on said homopolyethylene glycol or ethylene oxide/propylene oxide copolymer, and
            (iii) mixtures thereof,
        (3) an ionic-group-containing diol and/or diamine, and
        (4) one or more chain lengthening agents having molecular weights of from 32 to 349,
    wherein said polyurethane (a) is prepared by the one-shot reaction of components (1), (2), (3), and (4) or by reaction of components (1), (2), and (3) to form a prepolymer that is then reacted with component (4), or
    (b) a precursor that is reactive at elevated temperatures of about 70° to about 100° C. and capable of forming said polyurethane (a) prepared from
        (i) a blocked isocyanate prepolymer corresponding to said polyurethane (a), and
        (ii) a cross-linking agent; and (B) optionally, one or more organic solvents in a quantity of up to 80% by weight, based on the sum of components (A) and (B),
    wherein said coating composition contains less than 5% by weight of water, based on the sum of components (A) and (B).

2. A coating composition according to claim 1 wherein the polyurethane (a) has an elongation at break of from 400 to 700%.

3. A coating composition according to claim 1 wherein the hydroxyl-terminated polyether used to prepare polyurethane component (a) has a number average molecular weight of from 800 to 2500.

4. A coating composition according to claim 1 wherein the ethylene oxide/propylene oxide copolymer having 2 or 3 hydroxyl groups contains a predominant proportion by weight of ethylene oxide units.

5. A coating composition according to claim 1 wherein the homopolyethylene glycol or ethylene oxide/propylene oxide copolymer contains 2 hydroxyl end groups.

6. A coating composition according to claim 1 wherein the sequence length n of the polyethylene oxide units —$(CH_2CH_2O)_n$— is 4 to 25.

7. A coating composition according to claim 1 wherein the ionic-group-containing diol and/or diamine is selected from the group consisting of (i) a diol having the formula

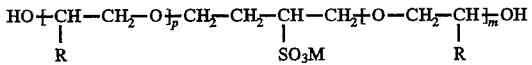

wherein

R denotes hydrogen or an organic group having 1 to 8 carbon atoms, m and p independently denote numbers from 1 to 10, and M denotes an ammonium cation or the cation of an alkali metal, (ii) a propoxylated product of addition of sodium bisulfite and butane-1,4-diol, (iii) a diaminosulfonate of the formula

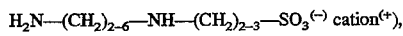

(iv) a diaminocarboxylate of the formula

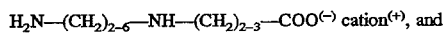

(v) mixtures thereof.

8. A textile or leather coating that is permeable to water vapor prepared by applying to a textile or leather substrate a coating composition comprising (A) a polyurethane system containing either (a) a polyurethane having an elongation at break (according to DIN 53,504) of from 200 to 1000% and containing ionic groups in a quantity of from 0.5 to 40 milliequivalents per 100 g of polyurethane (a) and from 10 to 45% by weight, based on polyurethane (a), of polyethylene oxide units —$(CH_2CH_2O)_n$— in which the sequence length n is from 3 to 55, prepared from (1) one or more polyisocyanates, (2) one or more hydroxyl-terminated polyethers having number average molecular weights of from 350 to 5000 selected from the group consisting of (i) a homopolyethylene glycol or an ethylene oxide/propylene oxide copolymer containing 2 or 3 hydroxyl end groups and having polyethylene oxide units distributed in blocks or at random, (ii) a polycarbonate or polyether ester based on said homopolyethylene glycol or ethylene oxide/propylene oxide copolymer, and (iii) mixtures thereof, (3) an ionic-group-containing diol and/or diamine, and (4) one or more chain lengthening agents having molecular weights of from 32 to 349, wherein said polyurethane (a) is prepared by the one-shot reaction of components (1), (2), (3), and (4) or by reaction of components (1), (2), and (3) to form a prepolymer that is then reacted with component (4), or (b) a precursor that is reactive at elevated temperatures of about 70° to about 100° C. and capable of forming said polyurethane (a) prepared from (i) a blocked isocyanate prepolymer corresponding to said polyurethane (a), and (ii) a cross-linking agent; and (B) optionally, one or more organic solvents in a quantity of up to 80% by weight, based on the sum of components (A) and (B), wherein said coating composition contains less than 5% by weight of water, based on the sum of components (A) and (B).

9. A textile or leather coating according to claim 8 wherein the hydroxyl-terminated polyether used to prepare polyurethane component (a) has a number average molecular weight of from 800 to 2500.

10. A textile or leather coating according to claim 8 wherein the ethylene oxide/propylene oxide copolymer having 2 or 3 hydroxyl groups contains a predominant proportion by weight of ethylene oxide units.

11. A textile or leather coating according to claim 8 wherein the homopolyethylene glycol or ethylene oxide/propylene oxide copolymer contains 2 hydroxyl end groups.

12. A textile or leather coating according to claim 8 wherein the sequence length n of the polyethylene oxide units —$(CH_2CH_2)$— is 4 to 25.

13. A textile or leather coating according to claim 8 wherein the ionic-group-containing diol and/or diamine is selected from the group consisting of (i) a diol having the formula

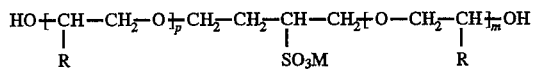

wherein

R denotes hydrogen or an organic group having 1 to 8 carbon atoms, m and p independently denote numbers from 1 to 10, and M denotes an ammonium cation or the cation of an alkali metal, (ii) a propoxylated product of addition of sodium bisulfite and butane-1,4-diol, (iii) a diaminosulfonate of the formula

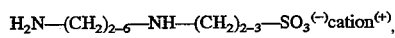

(iv) a diaminocarboxylate of the formula

(v) mixtures thereof.

14. A textile or leather coating according to claim 8 wherein the hydroxyl-terminated polyether used to prepare polyurethane component (a) has a number average molecular weight of from 600 to 2500.

15. A method for coating a textile or leather with a coating that is permeable to water vapor comprising applying to said textile or leather a coating composition comprising (A) a polyurethane system containing either (a) a polyurethane having an elongation at break (according to DIN 53,504) of from 200 to 1000% and containing ionic groups in a quantity of from 0.5 to 40 milliequivalents per 100 g of polyurethane (a) and from 10 to 45% by weight, based on polyurethane (a), of polyethylene oxide units —$(CH_2CH_2O)_n$— in which the sequence length n is from 3 to 55, prepared from (1) one or more polyisocyanates, (2) one or more hydroxyl-terminated polyethers having number average molecular weights of from 350 to 5000 selected from the group consisting of
  (i) a homopolyethylene glycol or an ethylene oxide/propylene oxide copolymer containing 2 or 3 hydroxyl end groups and having polyethylene oxide units distributed in blocks or at random,
  (ii) a polycarbonate or polyether ester based on said homopolyethylene glycol or ethylene oxide/propylene oxide copolymer, and
  (iii) mixtures thereof,
(3) an ionic-group-containing diol and/or diamine, and
(4) one or more chain lengthening agents having molecular weights of from 32 to 349, wherein said polyurethane (a) is prepared by the one-shot reaction of components (1), (2), (3), and (4) or by reaction of components (1), (2), and (3) to form a prepolymer that is then reacted with component (4), or (b) a precursor that is reactive at elevated temperatures of about 70° to about 100° C. and capable of forming said polyurethane (a) prepared from
  (i) a blocked isocyanate prepolymer corresponding to said polyurethane (a), and
  (ii) a cross-linking agent; and (B) optionally, one or more organic solvents in a quantity of up to 80% by weight, based on the sum of components (A) and (B), wherein said coating composition contains less than 5% by weight of water, based on the sum of components (A) and (B).

16. A method according to claim 15 wherein the hydroxyl-terminated polyether used to prepare polyurethane component (a) has a number average molecular weight of from 800 to 2500.

17. A method according to claim 15 wherein the ethylene oxide/propylene oxide copolymer having 2 or 3 hydroxyl groups contains a predominant proportion by weight of ethylene oxide units.

18. A method according to claim 15 wherein the homopolyethylene glycol or ethylene oxide/propylene oxide copolymer contains 2 hydroxyl end groups.

19. A method according to claim 15 wherein the sequence length n of the polyethylene oxide units —$(CH_2CH_2O)_n$— is 4 to 25.

20. A method according to claim 15 wherein the ionic-group-containing diol and/or diamine is selected from the group consisting of
  (i) a diol having the formula

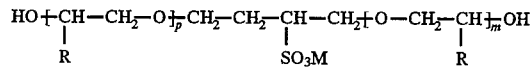

wherein
  R denotes hydrogen or an organic group having 1 to 8 carbon atoms,
  m and p independently denote numbers from 1 to 10, and
  M denotes an ammonium cation or the cation of an alkali metal, (ii) a propoxylated product of addition of sodium bisulfite and butane-1,4-diol,
  (iii) a diaminosulfonate of the formula

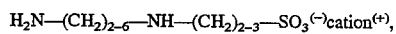

(iv) a diaminocarboxylate of the formula

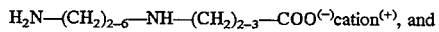

(v) mixtures thereof.

21. A method according to claim 15 wherein the hydroxyl-terminated polyether used to prepare polyurethane component (a) has a number average molecular weight of from 600 to 2500.

* * * * *